3,500,216
COMMUNICATION CIRCUIT MONITORING

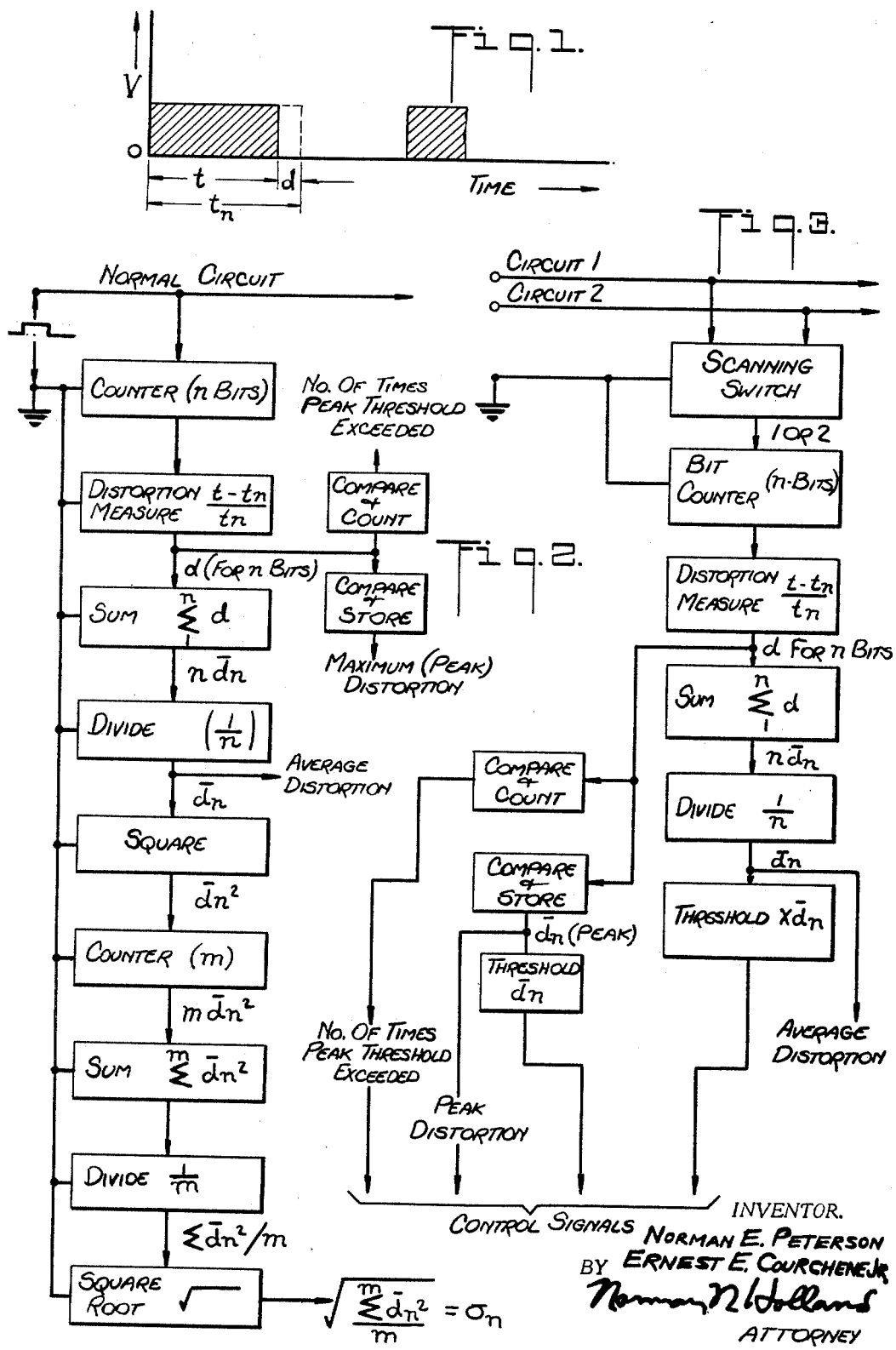

Norman E. Peterson and Ernest E. Courchene, Jr., Norwalk, Conn., assignors to Digitech, Inc., South Norwalk, Conn., a corporation of Connecticut
Continuation of application Ser. No. 525,714, Feb. 7, 1966. This application June 10, 1969, Ser. No. 834,217
Int. Cl. H04l 11/08
U.S. Cl. 328—163                                                   4 Claims

ABSTRACT OF THE DISCLOSURE

A circuit for monitoring a group of communication circuits carrying information in the form of a series of pulses or bits. The monitoring circuit is coupled in passive fashion to the operating circuits for monitoring them during their regular operation without interfering with normal communication. The monitoring means includes a scanning switch that couples it successively to each of the several circuits. While connected to a circuti, the monitoring system measures the distortion of the lengths of a series of pulses. The distortion measurement may include an average distortion for the group of pulses or an indication of the number of times the measured distortion for a group of pulses exceeds a predetermined amount or it also may include a measurement of the highest distortion for a pulse in the group of pulses measured. The distortion measures are connected through threshold means so that a control or alarm is operated when a preset threshold of distortion is exceeded.

---

This application is continuation of Ser. No. 525,714 filed Feb. 7, 1966, now abandoned.

The present application relates to the monitoring of communication circuits and more particularly to an improved process of monitoring one or more communication circuits where low quality or deteriorating circuits are quickly located independently of unobjectionable faults or random variations and so that false alarms are substantially eliminated.

Rapid increases in the number of communication networks in use and paticularly recent increases in the transmission of coded signals such as computer data interchange over such networks has resulted in increasingly complex systems having more and more individual circuits. Many such circuits will be terminated in or pass through transmission stations so that the task of continuously monitoring the quality or operativeness of the individual circuits in these transmission stations has become extremely difficult.

This has led to the use of automatic monitoring systems on the individual circuits where predetermined changes in the values of the signal parameters have been used to trigger warning devices. While offering a partial solution to this problem, in many cases these systems have themselves been objectionable due to their continual activation by temporary circuit noise or other random signal variations which activate the warning devices but which do not necessarily indicate circuit deterioration. The result of the almost continuous operation of such warning devices has caused the system operators to ignore the warnings so that the automatic systems have been largely ineffective.

The monitoring process of the present invention overcomes this by operating in a manner which eliminates such false alarms and so that the warning systems are only activated upon a significant indication of a beginning of a deterioration of the quality of the lines or other circuit elements. This is done by a monitoring process which includes a statistical analysis of normal circuit traffic as more fully described below.

Accordingly, an object of the present invention is to provide an improved monitoring process for communication circuits.

Another object of the present invention is to provide a communication circuit monitoring process capable of effectively monitoring a large number of circuits.

Another object of the present invention is to provide a communication circuit monitoring process regulated so that only indications of objectionable circuit deterioration activate the system warning means.

Another object of the present invention is to provide an improved communication circuit monitoring process based upon the use of standard deviation of signal distortion.

Another object of the present invention is to provide an improved monitoring process based upon the use of the arithmetic mean of signal distortion.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification; wherein:

FIG. 1 is a diagrammatic illustration of a signal pulse of one type monitored by the process of the present invention;

FIG. 2 is a diagrammatic showing of a system for analysing an operative circuit in accordance with the process of the invention; and FIG. 3 is a diagrammatic showing of a typical system for performing the monitoring process.

This invention covers an improved process of monitoring communication circuits where the properties of a series of signal pulses or a finite signal transmissoin period are analysed to obtain a threshold indicator or signal value which is indicative of a loss of circuit quality and which is independent of normal random signal variations or isolated spurious signals or noises and which is also independent of intermittent and significant but unobjectionable bursts of noise or interference on the circuit.

In the process of the invention, a properly functioning circuit is first analysed for a finite time period so that a record can be made of typical random variations which are normally expected on such a line and which are not objectionable as these variations do not indicate any deterioration in the quality of that particular line.

One of the most important signal forms used in communication circuits including teletypewriting, telegraph, computer interchange circuits, and other systems is a two-level or pulsed signal where the information is transmitted in a series of pulses or bits such as illustrated in FIG. 1 where a signal pulse is plotted as a voltage versus time. In normal operating circuits of high quality, series of such bits are transmitted in predetermined code patterns and the lengths of the bits and the lengths of the intervals between are substantially constant and are of a predetermined length. Certain variations of the lengths of bits and the intervals indicate a failure in equipment or the deterioration of the communication circuits. Accordingly, the lengths and shapes of these signals have been used to trigger warning devices.

In the improved process of the present invention, a statistical analysis is made of a normal transmission of such a signal to provide a threshold value or alarm value, as indicated above, which is independent of random and other signal variations which are not indicative of circuit trouble.

For example, the quality of circuits is often measured by the difference in length between the actual pulses on the line and their nominal duration, referred to as the nominal duration, i.e., $$d = \left(\frac{t - t_n}{t_n}\right)$$
$$d\% = 100d$$

where:

$d$ is the relative distortion;
$d\%$ is the percentage distortion;
$t$ is the actual length of the pulses; and
$t_n$ is the nominal pulse length.

Excessive distortion leads to message errors and, equally importantly, small but consistent values of distortion are indicative of eventual serious deterioration or failure of the circuit due either to the equipment or the signal transmission medium.

In such bias distortion, pulses are consistently longer or shorter than the nominal value. If all pulses were of exactly the same length, it would be sufficient to measure one of them to determine quality. However, superimposed on the bias type distortion is fortuitous or random distortion which makes the lengths of the individual pulses vary somewhat unpredictably. In order to detect bias distortion, it is necessary to eliminate the effect of the fortuitous distortion to the largest possible extent. An effective way to do this is to measure a number of pulses and to then take the average or arithmetic mean of their differences in length.

$$\bar{d}_n = \frac{1}{n} \sum_{i=1}^{n} d_i$$

$$\bar{d}_n = \frac{1}{nt_n} \sum_{i=1}^{n} (t_i - t_n) = \left(\frac{1}{nt_n} \sum_{i=1}^{n} t_i\right) - 1$$

where:

$\bar{d}_n$ is the average distortion of $n$ pulses;
$n$ is the number of pulses measured; and
$d_i$ is the distortion of the $i$th pulse.

One advantage in the use of the arithmetic mean is that the distribution of the mean approaches a normal distribution very quickly. For underlying distributions of the kind to be expected in the measurement of differences in pulse lengths averages over measurements of as few as 4 or 5 pulses will already have a distribution which is quite close to a normal one. The larger the number of pulses per sample, the closer the approximation. Thus, even if the distribution of individual pulse duration is not known exactly, that of their averages is known.

In addition, the spread of the sample mean around the nominal value is much less than the spread of the individual pulse measurements. As represented by the standard deviation, it varies inversely with the square root of the number of measurements per sample, $n$.

These advantages are useful to limit the number of false alarms while still identifying those lines whose bias distortion exceeds given values. In order to do this, the standard deviation for individual pulse time durations or for averages of $n$ pulses are obtained by measurements on a good channel.

$$\sigma = \sqrt{\frac{\sum d_i^2}{m}}; \quad \sigma_{(n)} = \sqrt{\frac{\sum \bar{d}_n^2}{m}}$$

where:

$\sigma$ is the standard deviation of the distribution of individual pulse length differences;
$m$ is the number of measurements taken for the determination of standard deviation; and
$\sigma_{(n)}$ is the standard deviation of the distribution of averages of $n$ pulse length differences.

Also, $$\sigma_{(n)} = \frac{\sigma}{\sqrt{n}}$$

For the initial determination of standard deviations $m$ is made fairly large, possibly of the order of several hundred, and much larger than $n$, the number of pulses per averaged sample.

Having obtained $\sigma_{(n)}$, the standard deviation of averages, either directly or by means of the above equation and using system as illustrated in FIG. 2, for example, thresholds for $\bar{d}_n$ can be set. A variety of circuits for performing the various functions as shown in each of the individual blocks of the diagram of FIG. 2 are well known and will not be described in detail herein.

The levels at which these thresholds are set in the monitoring system constitute a compromise between sensitivity to bias distortion and an acceptable number of false alarms. Whenever a $\bar{d}_n$ measured as illustrated in FIG. 3 on a line exceeds the alarm threshold action is taken. Depending on the refinement of the system this action can be of various kinds, i.e. the channel may be reported defective; or one or more additional samples may be measured on the same line against the same threshold; or the additional samples may be compared to a more stringent threshold. Upon failure of the subsequent test, the line is then reported defective.

An alternate procedure is to have two thresholds, where the higher one is the action threshold and gives a defective line report, and the lower one is a warning threshold which then resamples one or more times.

Table 1 relates the percentages of false alarms to be expected at various threshold levels. The use of the table is best illustrated by an example. Assuming that $\sigma_{(8)}$ (the standard deviation of averages of 8 pulses) was found to be equal to 4% as a result of extensive measurements on a good channel. Since it is known that these averages are approximately normally distributed, columns 2 and 3 apply. If the alarm threshold is set at $3\sigma$, this means $\pm 12\%$ distortion (threshold value for $\bar{d}_n$). With this threshold, approximately 9.27% of samples will yield false alarms (column 2). If one sample per second is obtained, the false-alarm rate will be about $36 \times 0.0027 = 9.7$ per hour; that is, about 10 alarms per hour are to be expected even when all channels are normal and where only one threshold and one measurement is used to sound the alarm.

The confidence level (column 3) has the following interpretation: with a $3\sigma$ threshold, if the alarm sounds for a particular channel, there is a probability of 99.7 percent that the channel has a bias distortion of 12% or more. Thus, with a threshold of $3\sigma$, the test has a confidence level of 99.7 percent.

TABLE 1.—FALSE ALARM RATIOS AND CONFIDENCE LEVELS

| Multiples of $\sigma$ | Normal Distribution | | Camp-Meidell Conditions, Maximum Possible Percent of False Alarms |
|---|---|---|---|
| | Percent of Samples Resulting in False Alarms, R% | Confidence Levels, 100−R% | |
| ±0.5 | 61.7 | 38.3 | |
| ±1.0 | 31.7 | 68.3 | |
| ±1.5 | 13.4 | 86.6 | |
| ±2.0 | 4.55 | 95.5 | 11.1 |
| ±2.5 | 1.24 | 98.76 | 7.1 |
| ±3.0 | 9.27 | 99.73 | 4.9 |
| ±3.5 | 0.05 | 99.95 | 3.6 |
| ±4.0 | 0.006 | 99.994 | 2.8 |
| ±4.5 | 0.0007 | 99.9993 | 2.2 |
| ±5.0 | 0.00006 | 99.99994 | 1.8 |

The sensitivity of the test can be increased, or the false alarm rate decreased, or both, with the aid of multiple sampling. With the $2\sigma$ point as threshold, the alarm may be set to sound only when two successive measurements fail the test (if the first measurement is satisfactory, no second measurement is made). From Table 1, column 2, the false alarm rate of $2\sigma$ is $4.55\% = 0.0455$. The probability that two successive measurements on a good channel will exceed 8% bias distortion ($2\sigma$ level) is $$0.0455^2 = 0.00216 = 0.216\%$$

This test can detect 8% bias distortion (increased sensitivity) with a false alarm ratio of 0.216% (slightly better than the previous test). The confidence level is 99.8 percent. This has been accomplished at the expense of a slight increase in the number of measurements to be performed, i.e. about 5% of all good channels are measured a second time due to their fortuitously failing the first measurements. False alarm rates and confidence levels for other multiples of $\sigma$ are similarly obtained from any table of the normal distribution.

In addition to being subject to bias distortion, pulses are also subject to random or fortuitous distortion. This also manifests itself as variations in pulse lengths. This phenomenon occurs to a certain extent in all circuits; however, in highly reliable circuits such as wire, cable, etc., this random distortion remains at tolerable levels at all times. On the other hand, high frequency radio circuits often become unsatisfactory and break down due to an increase in the incidence of random distortion. Measurements of bias distortion will not detect this, since these measurements as described above are designed precisely to eliminate the randomness. Therefore, those circuits subject to random distortion have to be tested specifically for this phenomenon. Various measures for random distortion can be used. The simplest is to measure the largest distortion of a single pulse within a sample of $n$ pulses (peak value). However, this is a very unreliable indicator since for reasonable values of sensitivity the false alarm rate is prohibitively high. A somewhat better indicator is the average of the absolute values of the individual distortions of the $n$ pulses in a sample. From a statistical viewpoint the most satisfactory measure of dispersion from the nominal value is the mean square deviation; its square root is the standard deviation, $\sigma_s$.

A test procedure based on measuring $\sigma_s$ for each sample of $n$ pulses on a line is similar to that for bias distortion as described above.

$$\sigma_s = \sqrt{\frac{\sum_{i}^{n} d_i^2}{n}}$$

Measurements must first be made on good channels to establish the standard deviation of $\sigma_s$ ($\sigma_\sigma$) as already described. Thresholds are then set at appropriate multiples of $\sigma_\sigma$. It may be that $\sigma_s$ is also normally distributed; however, statistical theory does not guarantee this as it does in the case of standard deviations of averages. However, worst-cases limits of the false alarm rate can be given.

Distributions which satisfy the Camp-Meidell conditions have false alarm rates not higher than those given in Table 1, column 4. It can be seen that for the higher multiples of $\sigma_\sigma$, the rates are much less favorable than those for the normal distribution, however, these are absolute worst-case conditions.

The use of the data of column 4 is the same as that described for the normal distribution in connection with the bias distortion tests. Measuments are made in the field to determine $\sigma_\sigma$, the thresholds which combine acceptable sensitivities and false alarm rates are set. If Camp-Meidell estimates are used, multiple samples will be necessary due to the rather high false alarm rate which would otherwise result.

The above description of monitoring employing use of the arithmetic mean and standard deviations based thereon applies also where the mean absolute value is used. The mean absolute value is a measure which is sometimes more meaningful than the mean value. For example, if $d_i$ as used above is defined as the absolute value of distortion of $i$th pulse, than the $\bar{d}_n$ becomes the average absolute distortion of $n$ pulses.

There are other significant measurements which may be made in normal circuits and thereafter used in a monitoring process to determine the quality of circuits. One such value is the peak or maximum distortion encountered during normal operation. As illustrated in FIG. 2 this value may be taken and stored in a suitable compare and store circuit which also acts to continuously compare and to store the largest distortion detected.

In addition a peak value of distortion may be determined and a compare and count circuit may be used as illustrated in FIG. 2 to provide a reading of the number of times this peak threshold is exceeded on the normal line during a given period of operation.

These values of distortion may also be used in the monitoring circuit as illustrated in FIG. 3. A similar compare and count circuit may be connected to the distortion value read out provided in the monitoring circuit and may be set to give a control or alarm signal when the peak distortion is exceeded a pre-determined number of times or the compare and store circuit may be used to give a control signal as soon as a given peak distortion value is exceeded. It is clear that these additional values and other similar signal values may be determined and monitored by themselves or they may be obtained as a subsidiary measuring and monitoring operation in the more complex measuring and monitoring circuits based upon the mean values of distortion of the standard deviation as described above.

It will be seen that an improved circuit monitoring method is described which permits a large number of circuits to be monitored and where the process gives a warning of both actual failures and of deteriorating circuits which are approaching failure. The process is of great value as the above results are obtained with a significant reduction in false indications. Even where a very large number of circuits are being monitored, this restriction of the warning signals makes prompt attention to the faulty circuits possible.

Having thus described our invention, we claim:

1. A method for providing a warning control signal indicating circuit deterioration for individual circuits in a plurality of circuits transmitting information in the form of a series of pulses of predetermined lengths comprising the steps of scanning the plurality of circuits and periodically measuring pulse distortion as compared with a signal on a normal circuit of pulse lengths of a group of pulses in the individual circuits, and forming a control alarm signal when measured distortion for the group of pulses of any circuit exceeds significantly a predetermined threshold value.

2. The method as claimed in claim 1 in which the distortion measuring is of the average distortion for the said group of pulses.

3. The method as claimed in claim 1 in which the distortion measuring is of the peak distortion of the pulse distortion for the pulses of said group.

4. The method as claimed in claim 1 in which the distortion measuring is of the number of pulses in the said group of pulses for which the distortion exceeds a predetermined amount.

References Cited

UNITED STATES PATENTS

| | | | |
|---|---|---|---|
| 2,929,875 | 3/1960 | Boughtwood et al. | 328—162 |
| 3,129,286 | 4/1964 | Levick | 328—162 |
| 3,324,244 | 6/1967 | Britt et al | 328—162 |
| 3,421,021 | 1/1969 | Britt | 328—162 |

JOHN S. HEYMAN, Primary Examiner

HAROLD A. DIXON, Assistant Examiner

U.S. Cl. X.R.

178—69